United States Patent [19]

Polley et al.

[11] 4,059,522

[45] Nov. 22, 1977

[54] APPARATUS FOR PURIFYING WATER

[75] Inventors: Richard D. Polley; Eric L. Nilson; Roberto Constantakis; Donovan E. Pruitt, all of El Paso, Tex.

[73] Assignee: Iodinamics Corporation, El Paso, Tex.

[21] Appl. No.: 640,200

[22] Filed: Dec. 12, 1975

[51] Int. Cl.² ............................................. C02B 1/18
[52] U.S. Cl. ............................. 210/198 R; 23/272.7; 210/62; 210/169
[58] Field of Search .............. 23/267 B, 267 E, 272.7, 23/272.8; 137/101.11; 210/62, 169, 198 R

[56] References Cited

U.S. PATENT DOCUMENTS

| 452,172 | 5/1891 | West | 23/272.7 |
|---|---|---|---|
| 2,683,622 | 7/1954 | Dragon | 23/272.7 |
| 2,714,963 | 8/1955 | Lester et al. | 137/101.11 |
| 3,129,172 | 4/1964 | Dickey, Jr. et al. | 23/272.7 |
| 3,195,558 | 7/1965 | Klueber et al. | 23/272.7 |
| 3,340,888 | 9/1967 | Farison | 23/272.7 |
| 3,408,295 | 10/1968 | Vaichulis | 210/62 |
| 3,474,817 | 10/1969 | Bates et al. | 23/267 E |
| 3,595,395 | 7/1971 | Lorenzen | 23/272.7 |
| 3,807,434 | 4/1974 | Rasmussen et al. | 210/169 X |

Primary Examiner—Wilbur L. Bascomb, Jr.
Assistant Examiner—Robert H. Spitzer
Attorney, Agent, or Firm—Fleit & Jacobson

[57] ABSTRACT

Apparatus for purifying water comprising a fitting for installation in a water line to define a primary water flow path. A Venturi tube is mounted in the fitting and positioned in the primary water flow path. A secondary water flow path is established between the fitting at either end of the Venturi tube and the inlet of a tank connected to the fitting. The tank houses a container having an outlet communicating with the primary water flow path which contains a bed of elemental iodine crystals. The Venturi creates a pressure differential forcing a small portion of the water in the water line to flow through the bed of iodine crystals in the container and then be returned to the water line.

7 Claims, 4 Drawing Figures

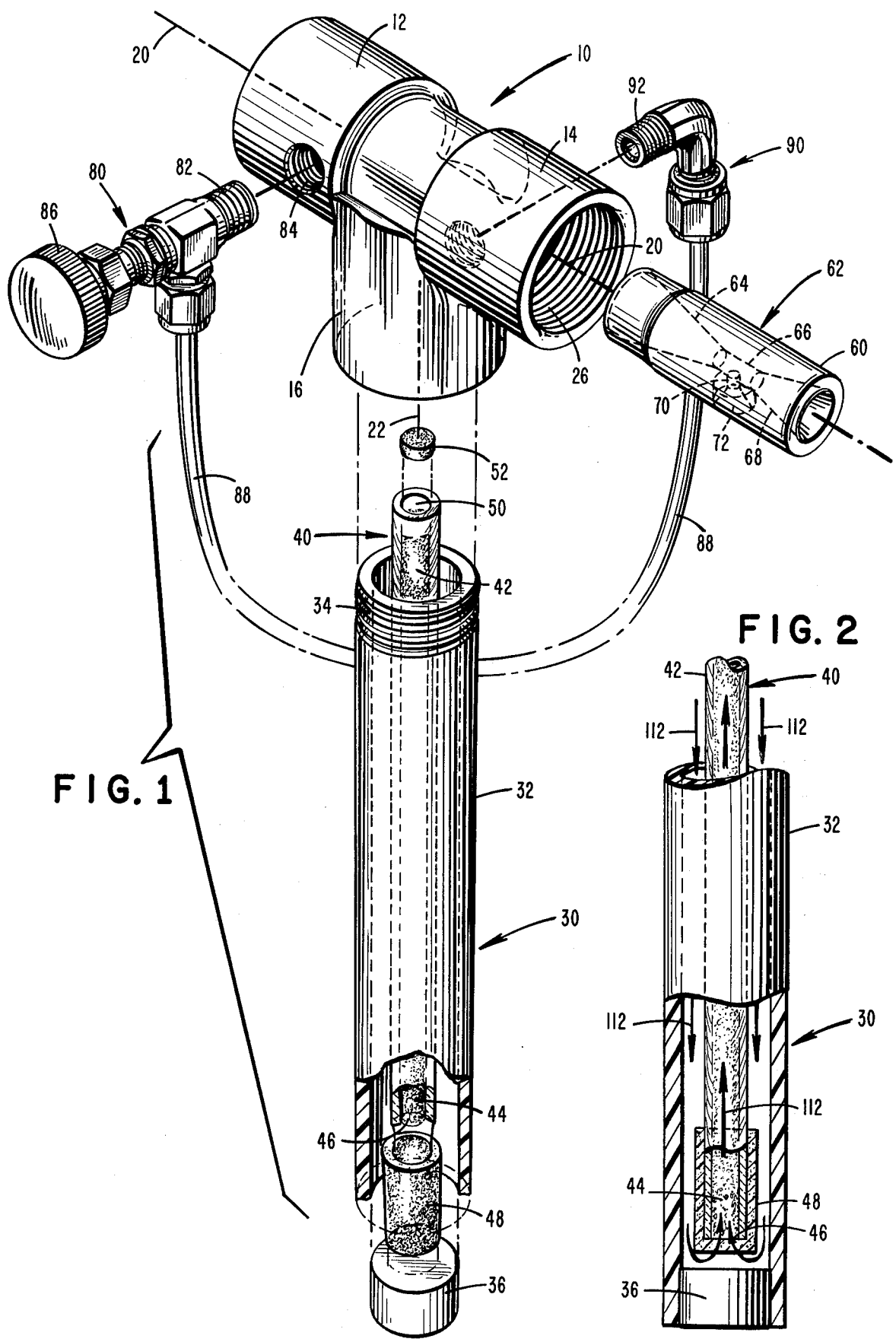

APPARATUS FOR PURIFYING WATER

BACKGROUND OF THE INVENTION

The present invention relates to an apparatus for purifying water and particularly to an apparatus for use with a purifying agent such as iodine.

Iodine rapidly, efficiently and safely kills bacteria, viruses, and cysts in water. Also, iodine has a number of chemical properties which make it superior to other purifying agents such as chlorine as a germ-killer and decontaminant. Iodine is weak chemically and reacts very slowly, if at all, with organic material. Chlorine, on the other hand, is chemically strong and reacts very quickly with the chemical compounds normally present in water. As a result, chlorine is used up at a high rate, rendering it inefficient as a germ-killer. The iodine residual is extremely stable, retaining its germicidal potency, while the chlorine residual is delicate and unstable. Also, chlorine combines rapidly with the nitrogenous matter present in water to form chloramines, which are basically ineffective as germ-killers. pH and sunlight have a relatively small effect on the germ-killing power of iodine. With chlorine, these factors have a pronounced effect. Finally, very little iodine can volatilize from water due to the low vapor pressure of the element. Accordingly, there is no odor or taste problem with iodinated water. By contrast, chlorinated water has an objectionably strong odor and taste.

Although the chemical properties of iodine are superior to chlorine as a water purifying agent, and the safety of iodine has been established by decades of extensive medical research, iodine has only recently begun to capture segments of the water purification market. One of the reasons for this has been the problem of cheaply and efficiently feeding iodine into a water supply. It is therefore an object of the present invention to provide an apparatus for feeding a water purifying agent such as iodine into a water supply system which can be cheaply manufactured, is simple to install and provides long-life and low maintenance operation.

SUMMARY OF THE INVENTION

In its preferred form, the water purification apparatus of the present invention comprises a fitting for installation in a water line having a Venturi tube positioned in the primary water flow path. A secondary water flow path is established between the primary water flow path at either end of the Venturi tube and the inlet of a tank connected to the fitting. A metering valve is positioned in the secondary water flow path upstream of the tank. A container is housed in the tank having an inlet communicating with the tank and an outlet communicating with the primary water flow path. The container holds a bed of iodine crystals which form a concentrated solution in the container. The Venturi creates a differential forcing a small portion of the water in the water line to flow through the tank. This water passes up through the bed of iodine crystals in the container and water containing iodine in dissolved form is returned to the water line and diluted to the desired concentration.

In accordance with this construction, an apparatus is provided which is simple and easy to install and enables water to be purified safely, efficiently and inexpensively over extended periods of time. The apparatus does not require moving parts which could cause breakdowns and does not require an external source of power. Also, the apparatus does not require mixing or adding of chemicals. In particular, because of its design and the materials utilized, the apparatus can be shipped with the bed of iodine crystals inserted at the factory as opposed to shipping the iodine separately and filling the apparatus on site. The apparatus is self-proportioning and the concentration of iodine in the water can be controlled with great accuracy. By using the Venturi tube, a low pressure drop is obtained in the water line during operation and a uniform hydraulic flow split can be obtained between the water line and the iodine bed. Since only one valve is necessary, fast and easy adjustment of the desired iodine concentration can be obtained. Finally, reversing the apparatus during installation does not result in reversing the flow through the iodine bed because of the design of the Venturi.

BRIEF DESCRIPTION OF THE DRAWINGS

FIG. 1 is an exploded, perspective view partly in section of the preferred embodiment of the water purification apparatus of the present invention;

FIG. 2 is a vertical view partly in section of a portion of the water purification apparatus of FIG. 1;

DESCRIPTION OF THE PREFERRED EMBODIMENT

Figure 3:
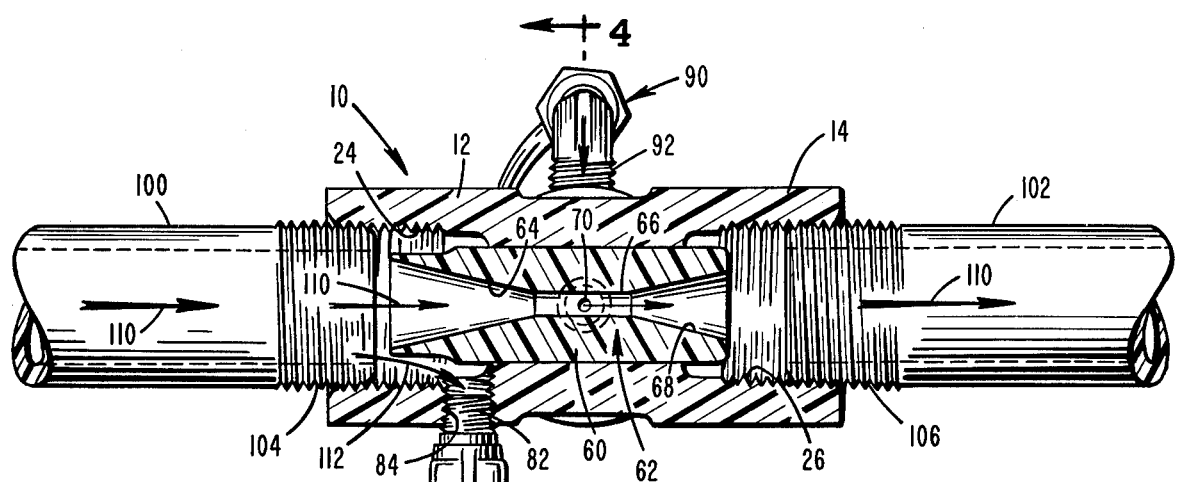
FIG. 3 is a horizontal sectional view of a portion of the water purification apparatus of FIG. 1 connected to a water supply line.
Figure 4:
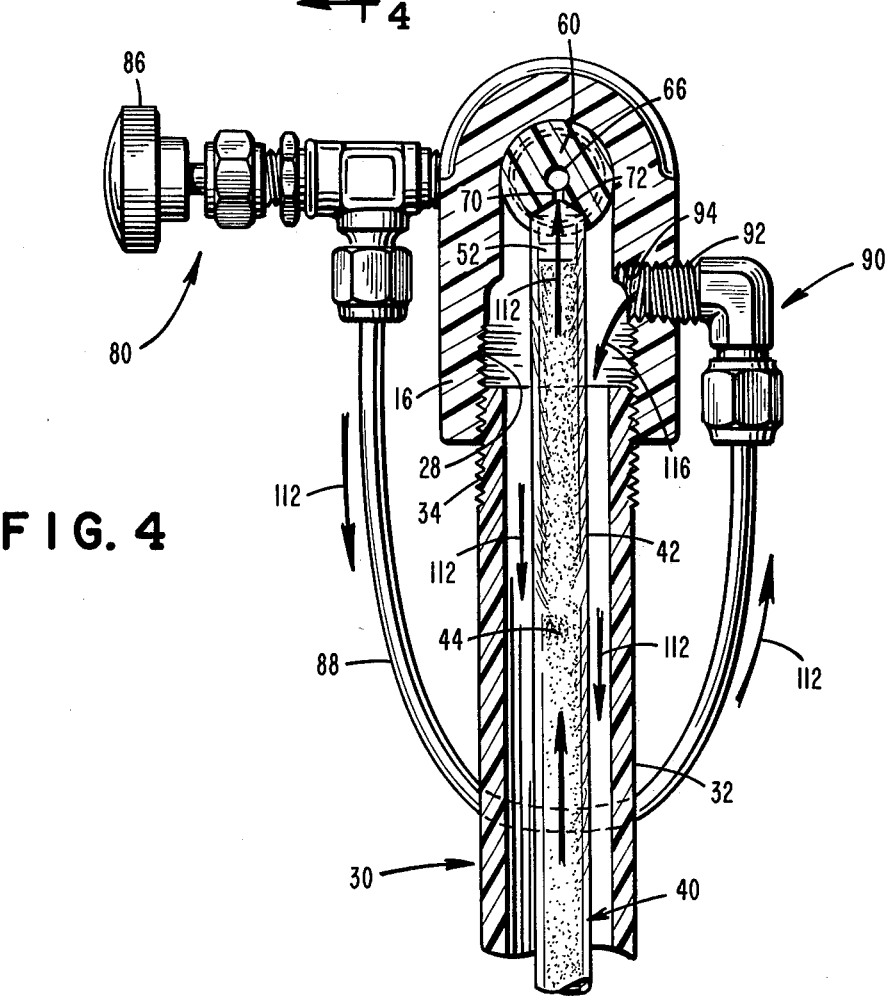
FIG. 4 is a vertical sectional view taken substantially along line 4—4 of FIG. 3.

Referring now in greater detail to the drawings, the water purification apparatus comprises a fitting 10 for installation in a water line. Fitting 10 comprises a tee having three cylindrical sections 12, 14, 16. Sections 12 and 14 have the same longitudinal axis 20 while the longitudinal axis 22 of section 16 extends perpendicular to axis 20. Sections 12, 14 and 16 of fitting 10 each define a threaded opening or bore 24, 26, and 28, respectively. Sections 12 and 14 of fitting 10 define a primary water flow path. Section 16 generally defines a secondary water flow path through which a small portion of the water flowing through the primary flow path is diverted to dissolve the disinfectant and then returned to the main stream.

Tank 30 comprises an elongated cylinder 32 which has a threaded upper end 34 which is adapted to be received in threaded opening 28 of fitting 10. The lower end of cylinder 32 is closed by plug 36 which fits in the end of the cylinder and is sealed to the inner walls of the cylinder. Tank 30 functionally comprises a sump which houses container 40.

Container 40 includes elongated cylinder 42 which is adapted to hold a bed 44 of purifying agent such as elemental iodine. The elemental iodine is suitably of technical grade, a material which is readily available on the market in purities of 99.5% and above. Elemental iodine is a solid and is normally supplied in a physical form of crystals. Container 40 is initially filled with iodine crystals which are slowly exhausted during use. The depth of bed 44, while variable, should be sufficient to cover the end 46 of the container. It has been found that the apparatus is effective even after up to 98.5% of the iodine bed is exhausted.

The inlet end 46 of cylinder 42 is covered by distributor 48. Distributor 48 comprises a cylindrical cap which fits over the inlet end 46 of the cylinder and snugly engages the outer walls of the cylinder. The outlet end 50 of cylinder 42 is in like manner covered by distributor 52 which comprises a plug which fits in the outlet opening and snugly engages the inner walls of the cylinder. Each of distributors 48 and 52 are pervious to the passage of water containing dissolved iodine and impervious to the passage of iodine crystals. The distributors typically have a nominal pore size of about 5 microns. Distributors 48 and 52 can suitably be formed from plastic foam such as polyethylene foam.

The water purification apparatus also comprises a tube 60 which defines a Venturi 62. Venturi 62 includes converging sections 64, throat 66 and diverging section 68. Tube 60 also defines port 70 which communicates with throat 66 of Venturi 62 and with opening 72 in the outer wall of the tube. Opening 72 is adapted to receive the upper or outlet end 50 of container 40 which is secured in the opening. Tube 60 is inserted into fitting 10 so that port 80 and opening 72 are axially aligned with axis 22.

Venturi 62 should be sized to provide a pressure differential which is at least equal to the pressure drop through the secondary water flow path and iodine bed 44 in particular. As will be appreciated, the fitting and Venturi sizes will depend on the size of the water flow line in which fitting 10 is adapted to be installed.

Metering valve 80 is of conventional design, typically a needle valve, and includes a threaded nipple 82 which is received in a threaded opening or bore 84 in the side wall of section 12 of fitting 10. The valve opening (not shown) is controlled by knob 86. Metering valve 80 is connected by tubing 88 to male elbow 90. Male elbow 90 has threaded nipple 92 which is received in threaded opening 94 in the side wall of section 16 of fitting 10.

As shown in FIG. 3, fitting 10 is adapted to be inserted into a water line between water inlet line 100 and water outlet line 102. To accomplish this, water inlet line 100 is conveniently provided with threaded end 104 which is adapted to be received in threaded opening 24 of fitting 10. In like manner, water outlet line 102 has threaded end 106 which is adapted to be received in threaded opening 26 of fitting 10.

Turning now to the operation of the water purification apparatus, the water to be purified is passed through water inlet line 100 in the direction of arrows 110. The primary water stream flows through fitting 10 passing sequentially through converging section 64, throat 66 and diverging section 68 of Venturi 62. Finally, the primary water stream exits fitting 10 and passes through outlet water line 102. Because of the pressure differential created by Venturi 62, a small portion of the water passes as a secondary flow stream through the bed of iodine crystals in the direction of arrows 112.

More specifically, the secondary flow stream passes out of threaded opening 84 in fitting 10 and through metering valve 80. The amount of water flowing through metering valve 80 is adjusted by rotation of knob 86 which suitably opens or closes the valve opening (not shown). This secondary flow stream then passes through tubing 88 and enters section 16 of fitting 10 after passing through male elbow 90. The water flows downward in tank 30 and then passes through distributor 48 and into container 40. The water then flows upward through the bed 44 of iodine crystals and exits container 40 through distributor 52. Finally, the secondary water stream is recombined with the primary water stream by passing through port 70 and into throat 66 of Venturi 62. The iodinated water flowing into Venturi 62 is then diluted in the primary water stream to the desired concentration.

Iodine in dissolved form is effective as a water purifying agent in concentrations as low as a fraction of a part per million (ppm), with concentrations in the range of 0.5 to 1 ppm being generally preferred. Since only a small portion of the primary water stream is diverted through iodine bed 44, the concentration of the secondary water stream is proportionally higher, typically 150 to 600 ppm at ambient temperature. Even at these concentrations, it is only necessary to retain the secondary water stream in container 40 for a short period of time to enable a sufficient quantity of iodine to go into solution. As will be appreciated, tank 30 and container 40 are normally filled with water even when no water is being pumped through water lins 100 and 102. Accordingly, there is normally a concentrated iodine solution in container 40 under usual operating conditions which reduces the retention time required to obtain the desired iodine concentration in the secondary water stream.

Furthermore, it has surprisingly been found that the iodine concentration in the secondary water stream is relatively independent of retention time and is more dependent on the flow rate through iodine bed 44. More specifically, it has been found that there is a minimum velocity through the iodine bed which should be maintained in order to produce a solution with a constant iodine concentration. This minimum velocity, as calculated through the freeboard area of cylinder 42, is about 7 cm/sec. This minimum velocity can be provided by selecting an appropriate cross-sectional area for cylinder 42 based on the volume flow through container 40.

The water purification apparatus of the present invention should be installed in the water flow system between the water pump and a holding tank such as a pressure tank or storage tank. In the event the apparatus is used for purifying water in a swimming pool, the swimming pool itself will act as the holding tank. If no holding tanks exists in the system, one should be installed to permit sufficient contact time between the purifying agent (the iodine residual) and the water before use. To determine the tank capacity, the gallons per minute pump rating is simply multiplied by a factor which will establish a sufficient holding period in the tank, typically 10 to 20 minutes, with about 15 minutes being generally preferred.

When the water purifications apparatus is first installed, metering valve 80 is set to provide the desired volume flow rate through the bed 44 of iodine crystals. The water in the outlet water flow line 102 should be tested, for example, through a drain valve (not shown) to determine residual iodine concentration in accordance with standard testing procedures. If the iodine concentration is not that desired, typically 0.5 ppm to 1.0 ppm, metering valve 80 is suitably adjusted. If too much residual iodine is present in the outlet water flow line 102 (e.g., more than 1.0 ppm), metering valve 80 is closed until the desired residual level is reached. On the other hand, if too little residual iodine (e.g., less than 0.5 ppm) is present, metering valve 80 is opened until the desired residual level is obtained. After this initial setting, the residual iodine concentration in outlet water flow line 102 will remain substantially constant over a relatively wide volume flow rate, typically 10 to 1 flow ratio, through the main water line.

To elaborate on the above, iodine dissolves in water to a known point of saturation. For example, at 20° C, iodine's saturation point in water is 300 parts per million. This means that, at a constant temperature of 20° C, theoretically 300 ppm iodine will dissolve in the water in container 40. Assuming that the metering valve 80 is set to divert approximately one-six hundredth of the flow in the main water line, this flow will pass up through the bed 44 of iodine crystals in container 40 and theoretically pick up 300 ppm iodine. When this flow recombines with the remainder of the water in the main line it will be diluted to the level of 0.5 ppm iodine. Although this is a simplified explanation, it illustrates the basic principles which are involved in the operation of the apparatus.

Above there has been described a specific embodiment of the present invention. It should be noted, however, that the above description is given for illustrative purposes only and that many alterations and modifications may be practiced by those skilled in the art without departing from the spirit and scope of the invention. For example, Venturi 62 has been illustrated as being defined by tube 60 although it will be appreciated that the Venturi can be defined by and integral with fitting 10. It is the intent therefore that the invention not be limited to the above but be limited only as defined in the appended claims.

We claim:

1. An apparatus for purifying water comprising a fitting for installation in a water line, said fitting having substantially parallel sections defining a primary water flow path having openings for receiving inlet and outlet water lines, said fitting also having a laterally extending section defining a secondary water flow path, a Venturi tube mounted in said fitting in said primary water flow path, said Venturi tube defining a Venturi having a converging section, a throat and a diverging section, said converging section and said diverging section adapted to face upstream and downstream, respectively, relative to said primary water flow path, said Venturi tube defining an opening communicating with said throat and said secondary water flow path, a tank removably connected to and extending below said laterally extending section of said fitting to define a sump, a container housed within said tank and secured at one end to said opening in said Venturi tube and having its other end extending above the bottom of said tank, said container adapted to hold a bed of iodine crystals, distributor means positioned at the inlet and outlet of said container, said distributor means being permeable to water containing dissolved iodine and impermeable to said iodine crystals, and a metering valve having an inlet communicating with said primary water flow line at one end of said Venturi tube and having an outlet in flow communication with the inlet of said tank, said Venturi creating a pressure differential forcing a small portion of the water to flow through said metering valve, said tank and said container and be returned to said primary water flow stream at the throat of said Venturi, said container having a cross-sectional flow area which provides minimum velocity, as calculated through the freeboard area of said container, of about 7 cm/sec based on the volume flow through said container to produce a solution with a constant iodine concentration.

2. An apparatus for purifying water comprising a fitting for installation in a water line to define a primary water flow path, a Venturi means mounted in said fitting in said primary water flow path, a container housed in a tank defining a sump and having an inlet for admitting water into said container and an outlet communicating with said primary water flow path at the throat of said Venturi means, said container adapted to hold a bed of solid purifying agent, means for establishing a secondary water flow path between said fitting at one end of said Venturi means and the inlet of said container, metering valve means positioned in the secondary water flow path upstream of said container, distributor means positioned at the inlet and outlet of said container, said distributor means being permeable to water containing dissolved purifying agent and impermeable to said purifying agent, said Venturi means adapted to create a pressure differential forcing a small portion of the water in the water line to flow through said bed of purifying agent and be returned to said primary water flow path, said container having a cross-sectional flow area which provides a minimum velocity, as calculated through the freeboard area of said container, of about 7 cm/sec based on the volume flow through said container to produce a solution with a constant purifying agent concentration.

3. The apparatus of claim 2 in which said Venturi means comprises a tube mounted in said fitting means, said tube defining a converging portion, a throat and a diverging portion, said converging portion and said diverging portion adapted to face upstream and downstream, respectively, relative to said water line.

4. The apparatus of claim 2 in which said fitting means comprises a tee fitting having a laterally extending section, said tank means being removably connected to said laterally extending section.

5. The apparatus in claim 4 in which said laterally extending section has a threaded opening to which said tank means is threadedly connected.

6. The apparatus of claim 5 in which said tank means comprises a cylinder threaded at one end for attachment to said tee fitting.

7. The apparatus of claim 2 in which said container means comprises a cylinder secured to said Venturi means at one end and having its other end positioned above the bottom of said tank means.

* * * * *